United States Patent
Tomita et al.

(10) Patent No.: US 12,030,446 B2
(45) Date of Patent: Jul. 9, 2024

(54) ELECTRIC JUNCTION BOX AND ACCOMMODATING METHOD OF HOLDING PORTION

(71) Applicant: YAZAKI CORPORATION, Tokyo (JP)

(72) Inventors: Kei Tomita, Makinohara (JP); Yukihiro Koyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 444 days.

(21) Appl. No.: 17/495,290

(22) Filed: Oct. 6, 2021

(65) Prior Publication Data

US 2022/0111808 A1 Apr. 14, 2022

(30) Foreign Application Priority Data

Oct. 12, 2020 (JP) ................................ 2020-172001

(51) Int. Cl.
*B60R 16/023* (2006.01)
*H01R 25/16* (2006.01)
*H02G 3/16* (2006.01)

(52) U.S. Cl.
CPC ......... *B60R 16/0238* (2013.01); *H01R 25/16* (2013.01); *H02G 3/16* (2013.01)

(58) Field of Classification Search
CPC ....... B60R 16/0238; H02G 3/16; H01R 25/16
USPC ....................................................... 439/76.2
See application file for complete search history.

(56) References Cited

U.S. PATENT DOCUMENTS

| 5,897,385 | A | * | 4/1999 | Kasai | B60R 16/0238 439/949 |
| 5,915,978 | A | * | 6/1999 | Hayakawa | H01R 9/2425 439/949 |
| 6,515,226 | B2 | * | 2/2003 | Chiriku | B60R 16/0238 174/58 |
| 7,549,873 | B2 | * | 6/2009 | Hayakawa | H05K 7/026 439/949 |
| 7,682,183 | B2 | * | 3/2010 | Kanazawa | H01R 13/6271 439/701 |
| 8,804,314 | B2 | * | 8/2014 | Kamo | B60R 16/0238 361/641 |

(Continued)

FOREIGN PATENT DOCUMENTS

| JP | 2010-74955 A | 4/2010 |
| JP | 2015-23353 A | 2/2015 |

(Continued)

*Primary Examiner* — Gary F Paumen
(74) *Attorney, Agent, or Firm* — Sughrue Mion, PLLC

(57) ABSTRACT

A case is formed with a long accommodation portion for accommodating an FL holder and a J/C adapter. The accommodation portion is provided with first locking portions configured to lock the FL holder. The FL holder is provided with second locking portions configured to be locked to the first locking portions, and a third locking portion configured to lock the J/C adapter. The third locking portion is provided at one end portion of the FL holder in a longitudinal direction. The J/C adapter is provided with a fourth locking portion configured to be locked to the third locking portion. The FL holder and the J/C adapter are arranged side by side in the accommodation portion along the longitudinal direction.

5 Claims, 8 Drawing Sheets

(56) References Cited

U.S. PATENT DOCUMENTS

| | | | | |
|---|---|---|---|---|
| 2008/0020606 A1* | 1/2008 | Iizuka | ................... | H02G 3/081 |
| | | | | 439/76.2 |
| 2009/0218129 A1* | 9/2009 | Taniguchi | .............. | H02G 3/081 |
| | | | | 174/503 |
| 2013/0082048 A1* | 4/2013 | Hirasawa | ............ | B60R 16/0238 |
| | | | | 220/3.9 |
| 2014/0051270 A1* | 2/2014 | Miyazaki | ............ | B60R 16/0238 |
| | | | | 439/76.2 |
| 2017/0215291 A1* | 7/2017 | Tsubouchi | ............... | H05K 5/03 |

FOREIGN PATENT DOCUMENTS

| | | |
|---|---|---|
| JP | 2017-135770 A | 8/2017 |
| JP | 2017-143611 A | 8/2017 |

\* cited by examiner

ELECTRIC JUNCTION BOX AND ACCOMMODATING METHOD OF HOLDING PORTION

CROSS-REFERENCE TO RELATED APPLICATIONS

This application is based on and claims priority under 35 USC 119 from Japanese Patent Application No. 2020-172001 filed on Oct. 12, 2020, the contents of which are incorporated herein by reference.

TECHNICAL FIELD

The present invention relates to an electric junction box and an accommodating method of a holding portion.

BACKGROUND ART

In the related art, an electric junction box (for example, a relay box) mounted on a vehicle has been known. The electrical junction box includes an FL holder that holds a fuse and a JC adapter that holds a branch circuit composed of a bus bar or the like (Patent Literatures 1 and 2).

CITATION LIST

Patent Literature

Patent Literature 1: JP-2010-74955-A
Patent Literature 2: JP-2015-23353-A

The above FL holder and JC adapter have different locking structures. For example, the JC adapter cannot be accommodated and locked in an accommodation portion of the FL holder. Therefore, it is necessary to separately provide an accommodation portion of the FL holder and an accommodation portion of the J/C adapter separately, which causes a problem that the size is increased.

SUMMARY OF INVENTION

The present invention has been made in view of the above circumstances, and an object thereof is to provide an electric junction box and an accommodating method of a holding portion, which achieve space-saving.

An electric junction box according to the present invention is an electric junction box including a first holding portion and a second holding portion that are configured to hold electronic components, and a case in which an accommodation portion for accommodating the first holding portion and the second holding portion is formed.

The accommodation portion is provided with a first locking portion configured to lock the first holding portion, the first holding portion is provided with a second locking portion configured to be locked to the first locking portion and a third locking portion configured to be locked to the second holding portion, and the second holding portion is provided with a fourth locking portion configured to be locked to the third locking portion.

In addition, an accommodating method of a holding portion is an accommodating method of a holding portion for selectively accommodating, of a first holding portion and a second holding portion which are configured to hold electronic components, the second holding portion into an accommodation portion of an electric junction box according to the present invention. When the second holding portion is not selected, the first holding portion is locked to the accommodation portion, and when the second holding portion is selected, the first holding portion is locked to the accommodation portion, and the second holding portion is locked to the first holding portion.

The present invention has been briefly described above. Further, details of the present invention will be clarified by reading a mode (hereinafter, referred to as an "embodiment") for carrying out the invention to be described below with reference to the accompanying drawings.

DESCRIPTION OF EMBODIMENTS

A specific embodiment according to the present invention will be described below with reference to the drawings.

Figure 1:
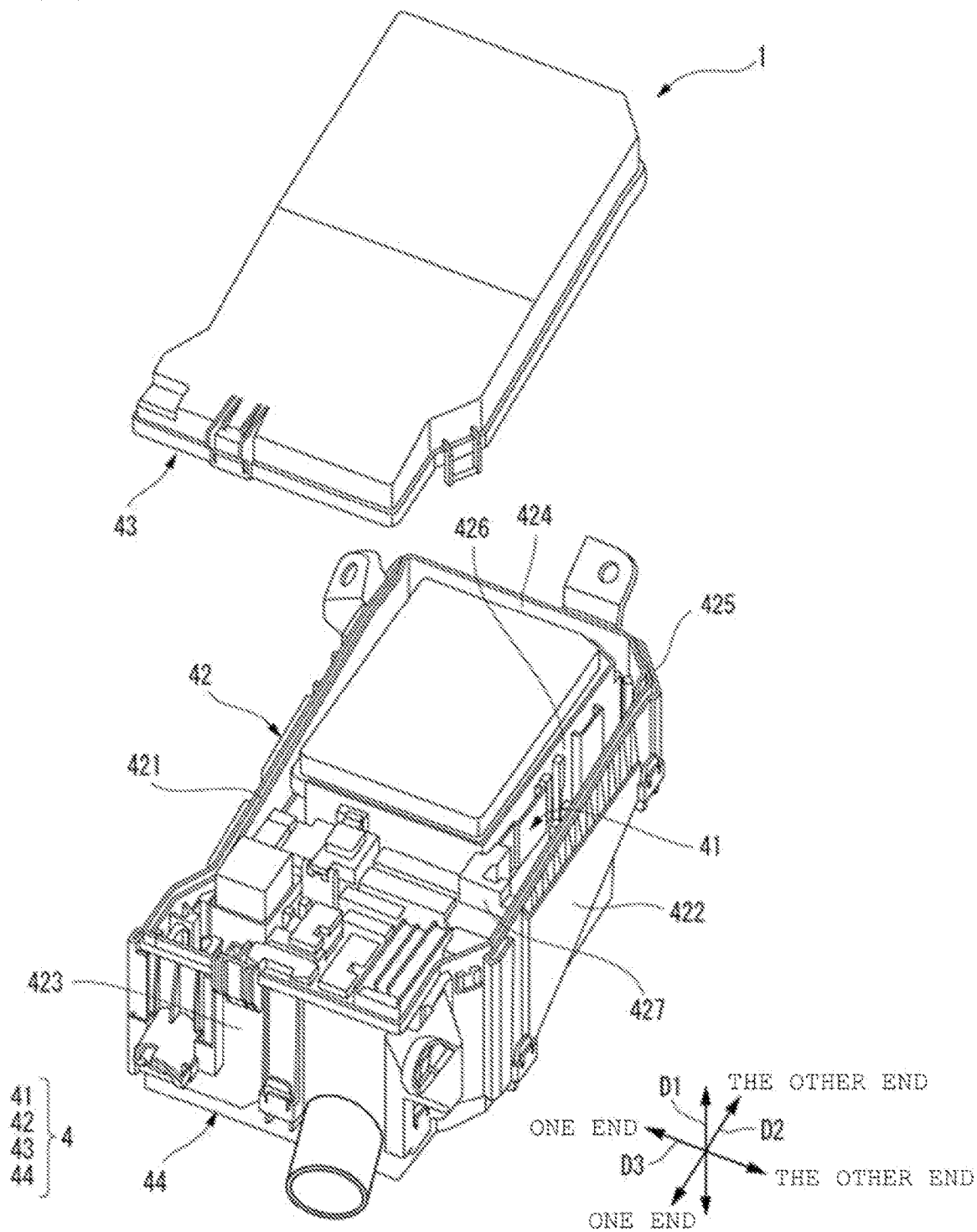
FIG. 1 is an exploded perspective view showing an embodiment of an electric junction box of the present invention.
Figure 2:
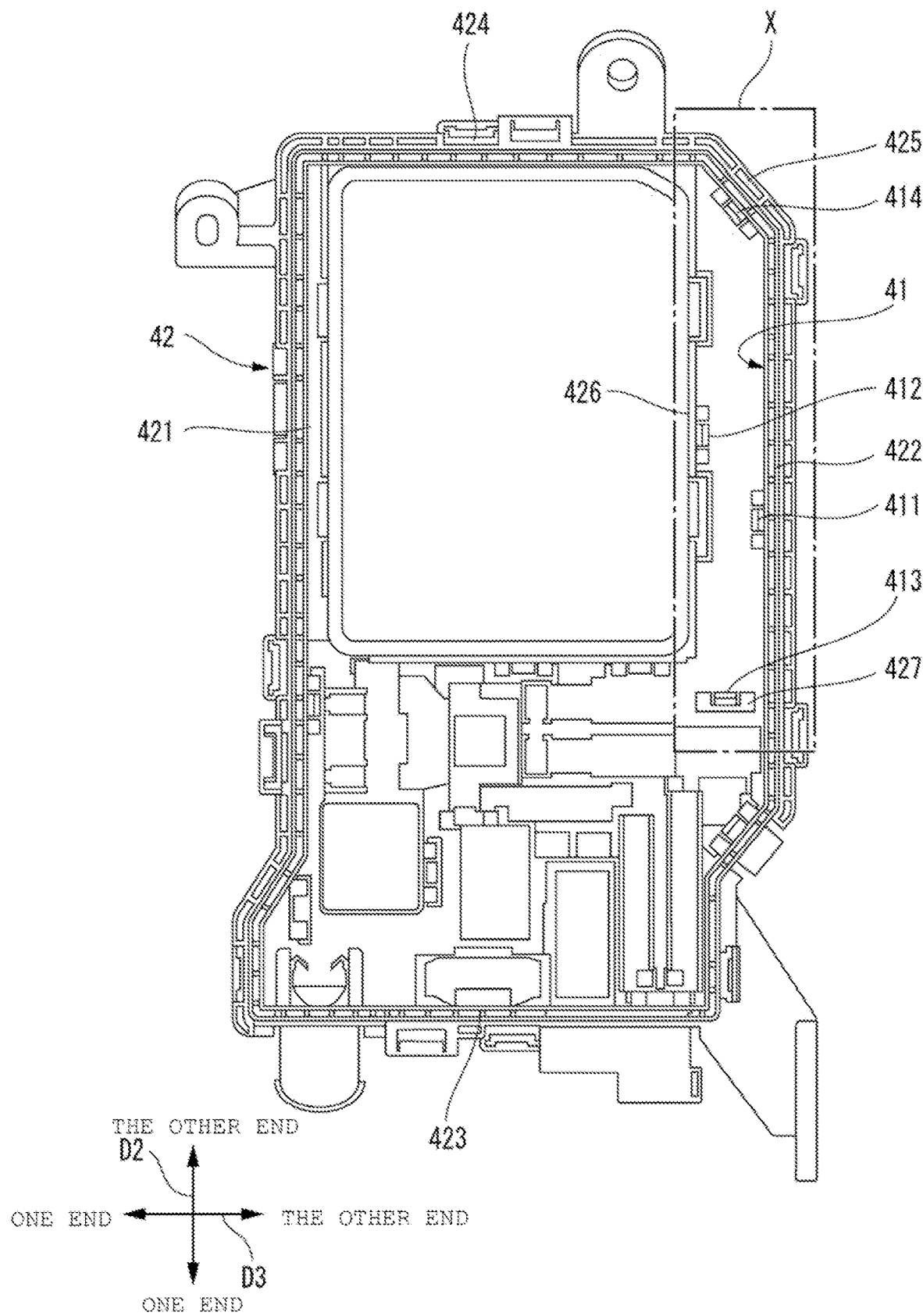
FIG. 2 is a top view of a state where an upper cover is removed from the electric junction box shown in FIG. 1.
Figure 3:
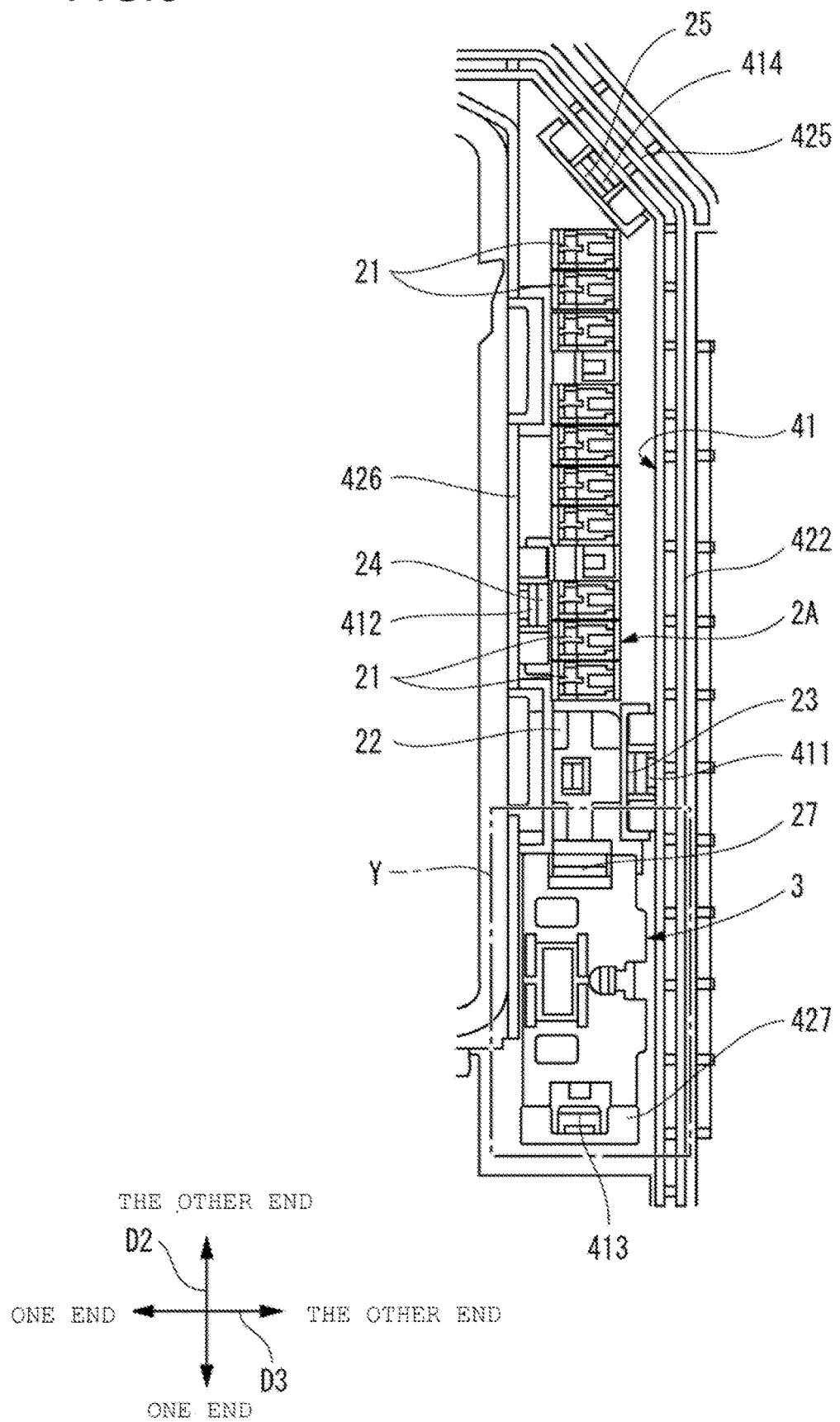
FIG. 3 is an enlarged view of an X part in a state where an FL holder and a J/C adapter are accommodated in the electric junction box shown in FIG. 2.
Figure 4:
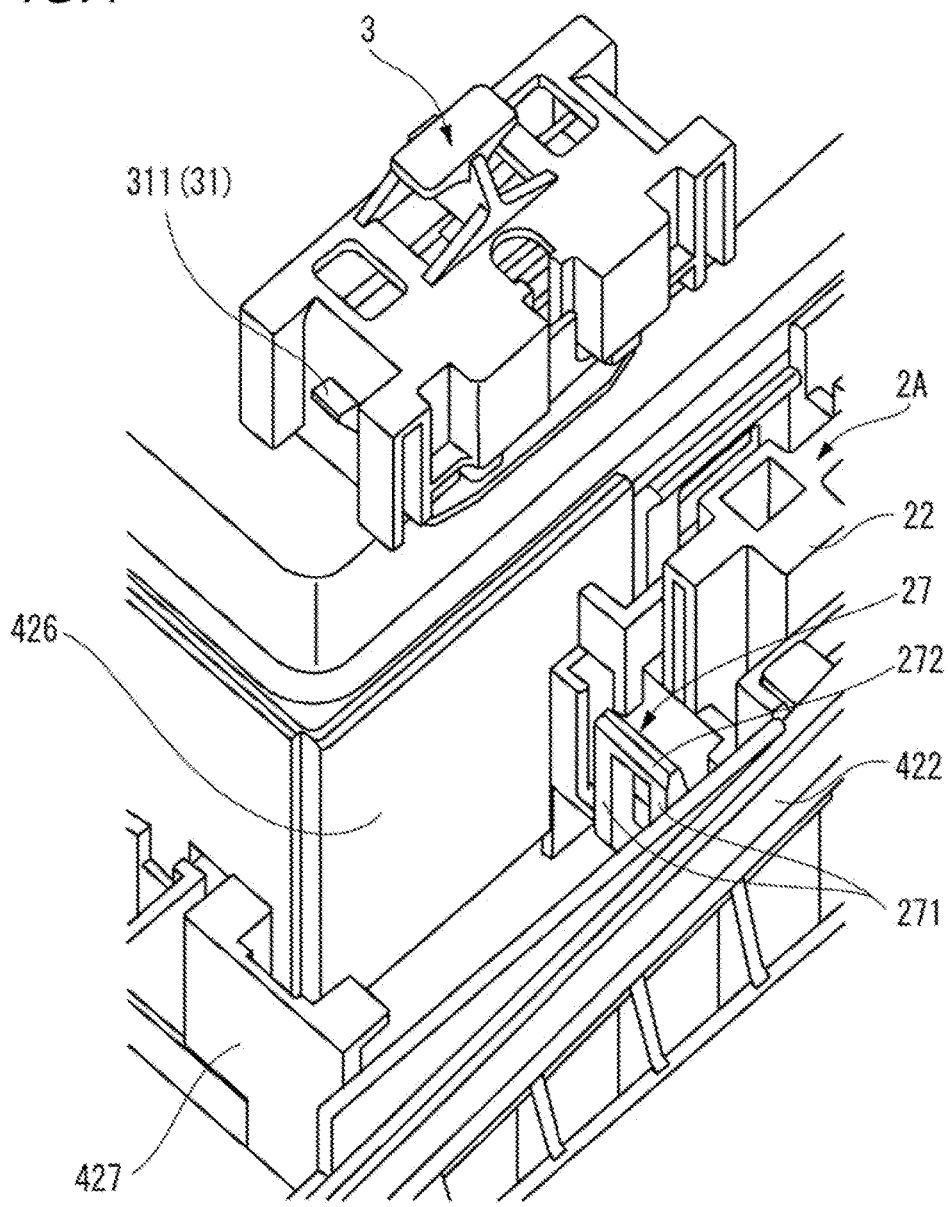
FIG. 4 is an enlarged perspective view of a Y part shown in FIG. 3.
Figure 4:
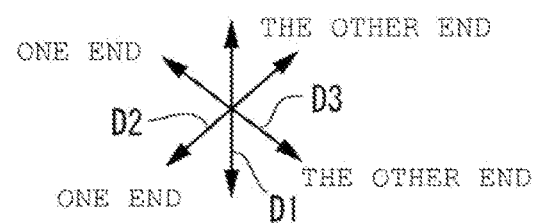

FIG. 1 is an exploded perspective view showing an embodiment of an electric junction box of the present invention. In FIG. 1, an FL holder and a J/C adapter accommodated inside the electrical junction box are omitted. FIG. 2 is a top view of a state where an upper cover is removed from the electric junction box shown in FIG. 1. FIG. 3 is an enlarged view of an X part in a state where the FL holder and the J/C adapter are accommodated in the electric junction box shown in FIG. 2. FIG. 4 is an enlarged perspective view of a Y part shown in FIG. 3.

An electric junction box 1 of the present embodiment is typically mounted on a vehicle and accommodates electronic components such as a relay and a fuse.

As shown in FIG. 3, the electrical junction box 1 includes an FL holder (first holding portion) 2A and a J/C adapter (second holding portion) 3. In addition, as shown in FIG. 1 and FIG. 2, the electric junction box 1 includes a case 4 in which an accommodation portion 41 for accommodating the FL holder 2A and the J/C adapter 3 is formed.

The FL holder 2A holds a plurality of fuses (electronic components). The J/C adapter 3 holds a branch circuit (electronic component) composed of a bus bar or the like.

Next, the case 4 will be described before the details of the FL holder 2A and the J/C adapter 3 are described. The case 4 includes a frame 42 in which the FL holder 2A and the J/C adapter 3 are accommodated, an upper cover 43 that closes an upper end opening of the frame 42, and a lower cover 44 that closes a lower end opening of the frame 42.

Hereinafter, for convenience of explanation, as shown in FIG. 1 to FIG. 4, an "up-down direction D1", a "longitudinal direction D2", and a "lateral direction D3" are defined. The "up-down direction D1", the "longitudinal direction D2", and the "lateral direction D3" are orthogonal to one another. When the electric junction box 1 is mounted on the vehicle, the "up-down direction D1" corresponds to the up-down direction of the vehicle. The frame 42 is provided with openings closed by the upper cover 43 and the lower cover 44 at both ends, and the openings provided at both ends are opposite to each other in the up-down direction D1. In addition, the frame 42 is provided in a substantially rectangular shape when viewed from above. The "longitudinal direction D2" corresponds to the longitudinal direction of the rectangular frame 42. The "lateral direction D3" corresponds to the lateral direction of the rectangular frame 42.

As shown in FIG. 1, FIG. 2 or the like, the frame 42 is provided with substantially square tubular peripheral walls 421 to 425 and partition walls 426 and 427 that partition the inside of the peripheral walls 421 to 425. A part of the peripheral walls 421 to 425 and the partition walls 426 and 427 form the accommodation portion 41, and the FL holder 2A and the J/C adapter 3 are accommodated in the accommodation portion 41. More specifically, the peripheral walls 421 and 422 are provided to be orthogonal to the lateral direction D3 and separated from each other in the lateral direction D3. The peripheral walls 423 and 424 are provided orthogonal to the longitudinal direction D2 and separated from each other in the longitudinal direction D2. Both end portions of the peripheral wall 423 in the lateral direction D3 are provided to be connected to one end portions of the peripheral walls 421 and 422 in the longitudinal direction D2. One end portion of the peripheral wall 424 in the lateral direction D3 is provided to be connected to the other end portion of the peripheral wall 421 in the longitudinal direction D2, and the other end portion of the peripheral wall 424 in the lateral direction D3 is provided to be connected, via the peripheral wall 425, to the other end portion of the peripheral wall 422 in the longitudinal direction D2. The peripheral wall 425 intersects both the longitudinal direction D2 and the lateral direction D3.

The partition wall 426 is orthogonal to the lateral direction D3 and is arranged to face the peripheral wall 422 in the lateral direction D3. The other end side of the partition wall 426 in the longitudinal direction D2 is connected to a boundary between the peripheral wall 425 and the peripheral wall 424. The partition wall 427 is orthogonal to the longitudinal direction D2 and is arranged to face the peripheral wall 425 in the longitudinal direction D2. The peripheral walls 425 and 422, and the partition walls 426 and 427 form the accommodation portion 41. A length of the partition wall 426 in the longitudinal direction D2 is longer than a length of the partition wall 427 in the lateral direction D3, and the accommodation portion 41 is provided in an elongated shape in the longitudinal direction D2.

Figure 5:
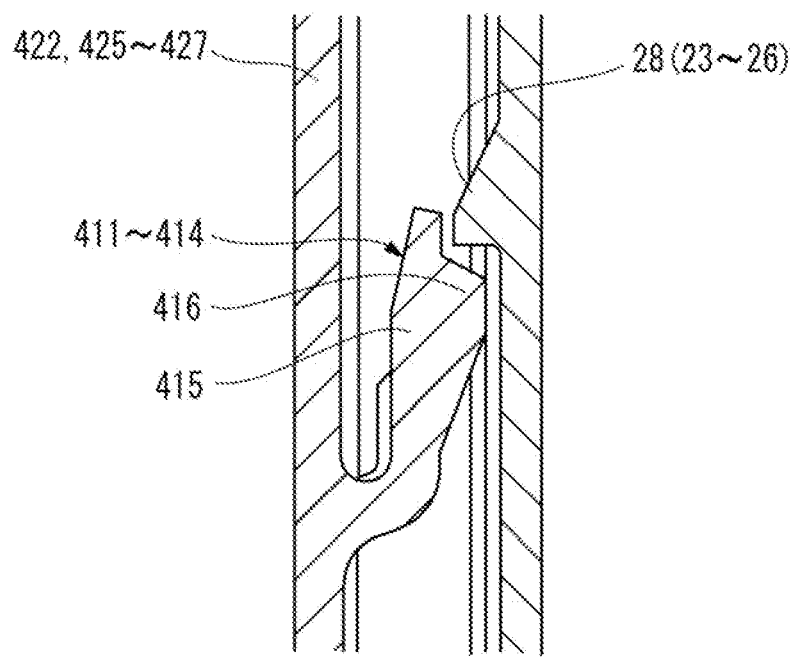
FIG. 5 is a cross-sectional view of a first locking portion shown in FIG. 4.

As shown in FIG. 2, the accommodation portion 41 is provided with a plurality of first locking portions 411 to 414 for locking the FL holder 2A. In the present embodiment, the first locking portions 411 to 414 are provided to protrude from the peripheral wall 422, the partition walls 426 and 427, and the peripheral wall 425, respectively. The first locking portions 411 and 412 provided on the peripheral wall 422 and the partition wall 426 are provided at positions displaced in the longitudinal direction D2. As shown in FIG. 5, the first locking portions 411 to 414 are provided with a locking arm 415 that protrudes upward from the peripheral walls 422 and 425 and the partition walls 426 and 427, and whose upper end is flexibly provided in a direction of contacting with and separating from the peripheral walls 422 and 425 and the partition walls 426 and 427, and a locking protrusion 416 that is provided slightly below an upper end of the locking arm 415.

Next, the FL holder 2A will be described. As shown in FIG. 3, the FL holder is provided with a plurality of mounting portions 21 for mounting the fuse and an input portion 22 for passing a current through the fuse, which are provided side by side along the longitudinal direction D2. The plurality of mounting portions 21 are provided side by side in the longitudinal direction D2. The input portion 22 is provided to be connected to one end portion of the plurality of mounting portions 21 in the longitudinal direction D2.

The FL holder 2A is provided with second locking portions 23 to 25 configured to be locked to the first locking portions 411, 412, and 414, and a third locking portion 27 configured to lock the J/C adapter 3. The second locking portions 23 and 24 are separately provided at both end portions of the FL holder 2A in the lateral direction D3, and the second locking portions 23 and 24 provided at both end portions in the lateral direction D3 are provided at positions displaced in the longitudinal direction D2. The second locking portion 23 is locked to the first locking portion 411, and the second locking portion 24 is locked to the first locking portion 412. As shown in FIG. 5, the second locking portions 23 to 25 each include a locking protrusion 28 whose protrusion amount increases toward the lower side in the up-down direction D1. Accordingly, when the FL holder 2A is inserted through the lower opening of the frame 42, the locking protrusion 28 bends the locking arm 415. When the FL holder 2A is inserted until the locking protrusion 28 gets over the locking protrusion 416, the locking arm 415 is restored and the locking protrusion 416 and the locking protrusion 28 are locked.

As shown in FIG. 4, the third locking portion 27 is provided at one end portion of the FL holder 2A in the longitudinal direction D2. The third locking portion 27 is provided with a pair of locking arms 271 and 271 that protrudes upward from one end surface of the FL holder 2A in the longitudinal direction D2 and whose upper end is flexibly provided in the longitudinal direction D2, and a locking connection portion 272 that connects the pair of locking arms 271 and 271 to each other. The pair of locking arms 271 and 271 are provided apart from each other in the lateral direction D3.

Figure 6:
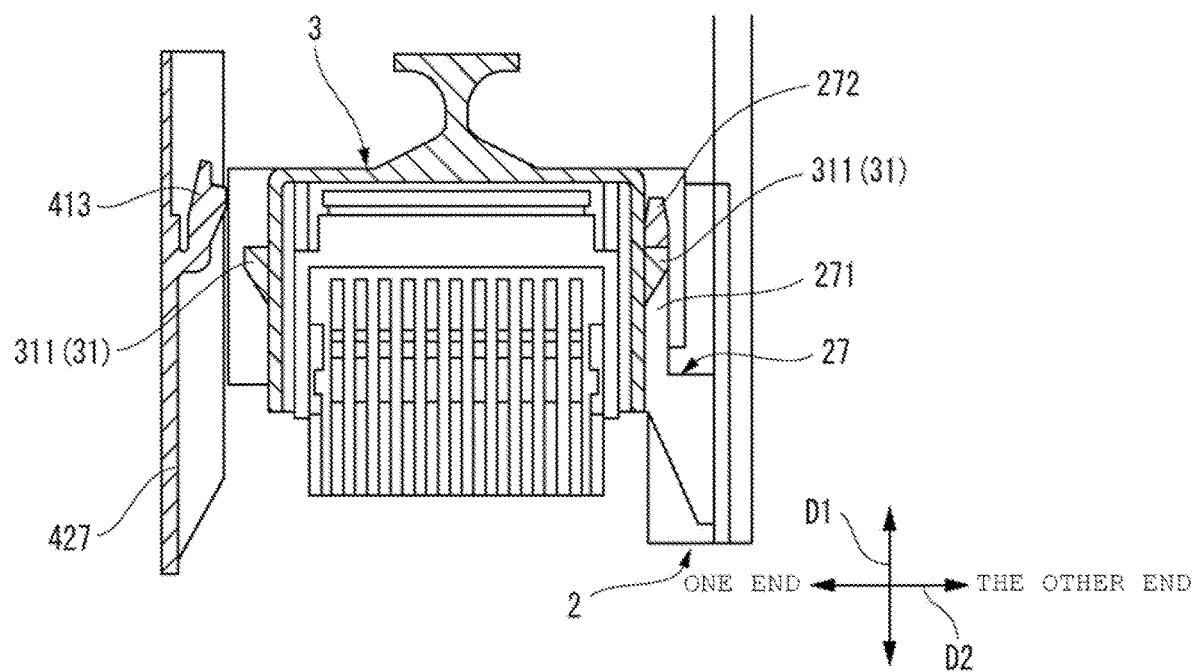
FIG. 6 is a cross-sectional view of a third locking portion shown in FIG. 4.

The J/C adapter 3 is provided in a long box shape in the longitudinal direction D2, and is provided with fourth locking portions 31 configured to be locked to the third locking portion 27 at both end portions in the longitudinal direction D2. As shown in FIG. 6, the fourth locking portions 31 each include a locking protrusion 311 whose protrusion amount increases toward the upper side in the up-down direction D1. Accordingly, when the J/C adapter 3 is inserted through the upper opening of the frame 42, the locking protrusion 311 comes into contact with the locking connection portion 272 and bends the pair of locking arms 271 and 271. When the J/C adapter 3 is inserted until the locking protrusion 311 is located below the locking connection portion 272, the pair of locking arms 271 and 271 are restored and the locking connection portion 272 and the locking protrusion 311 are locked.

In the J/C adapter 3, the other end side in the longitudinal direction D2 is held by the FL holder 2A, and the other end side in the longitudinal direction D2 is not held.

The locking structure of the fourth locking portion 31 of the J/C adapter 3 and the locking structure of the second locking portions 23 to 25 of the FL holder 2A described above are different from each other. Therefore, the fourth locking portion 31 of the J/C adapter 3 cannot be locked to the first locking portions 411 to 414 of the accommodation portion 41. Therefore, in the present embodiment, the FL holder 2A is provided with the third locking portion 27, and the J/C adapter 3 is locked to the FL holder 2A. Accordingly, the J/C adapter 3 can be accommodated in the accommodation portion 41 in which the structure that can be locked to the fourth locking portion 31 is not formed. Therefore, it is not necessary to separately provide an accommodation portion for the J/C adapter 3 and an accommodation portion for the FL holder 2A, so that the space can be saved.

According to the above embodiment, the accommodation portion 41 is formed in a long shape, and the third locking portion 27 is provided at one end portion of the FL holder 2A in the longitudinal direction D2. Accordingly, the FL holder 2A and the J/C adapter 3 can be arranged side by side in the accommodation portion 41 along the longitudinal direction D2. According to the above embodiment, the second locking portions 23 and 24 are separately provided at both end portions of the FL holder 2A in the lateral direction D3, and the second locking portions 23 and 24 separately provided at both end portions of the FL holder 2A in the lateral direction D3 are provided at positions displaced in the longitudinal direction D2. Accordingly, the locking between the FL holder 2A and the accommodation portion 41 can be strengthened.

Next, the accommodating method of a holding portion of the present invention will be described. Depending on the specifications of the vehicle, the J/C adapter 3 may not be required. Further, depending on the specifications of the vehicle, the number of fuses mounted on the FL holder 2 may decrease. The accommodating method of a holding portion of the present invention is a method of accommodating FL holders 2A to 2C and the J/C adapter 3 as holding portions having different shapes in accommodation portions having the same shape and the same size.

In the present embodiment, the FL holder 2A (FIG. 3) corresponding to a specification A of the vehicle, the FL holder 2B (FIG. 7) corresponding to a specification B of the vehicle, the FL holder 2C (FIG. 8) corresponding to a specification C of the vehicle, and the J/C adapter 3 are prepared.

Since the FL holder 2A and the J/C adapter 3 described above have already been described, detailed description thereof will be omitted here. As described above, the FL holder 2A is provided with the third locking portion 27 configured to be locked to the J/C adapter 3 at one end portion in the longitudinal direction D2.

Figure 7:
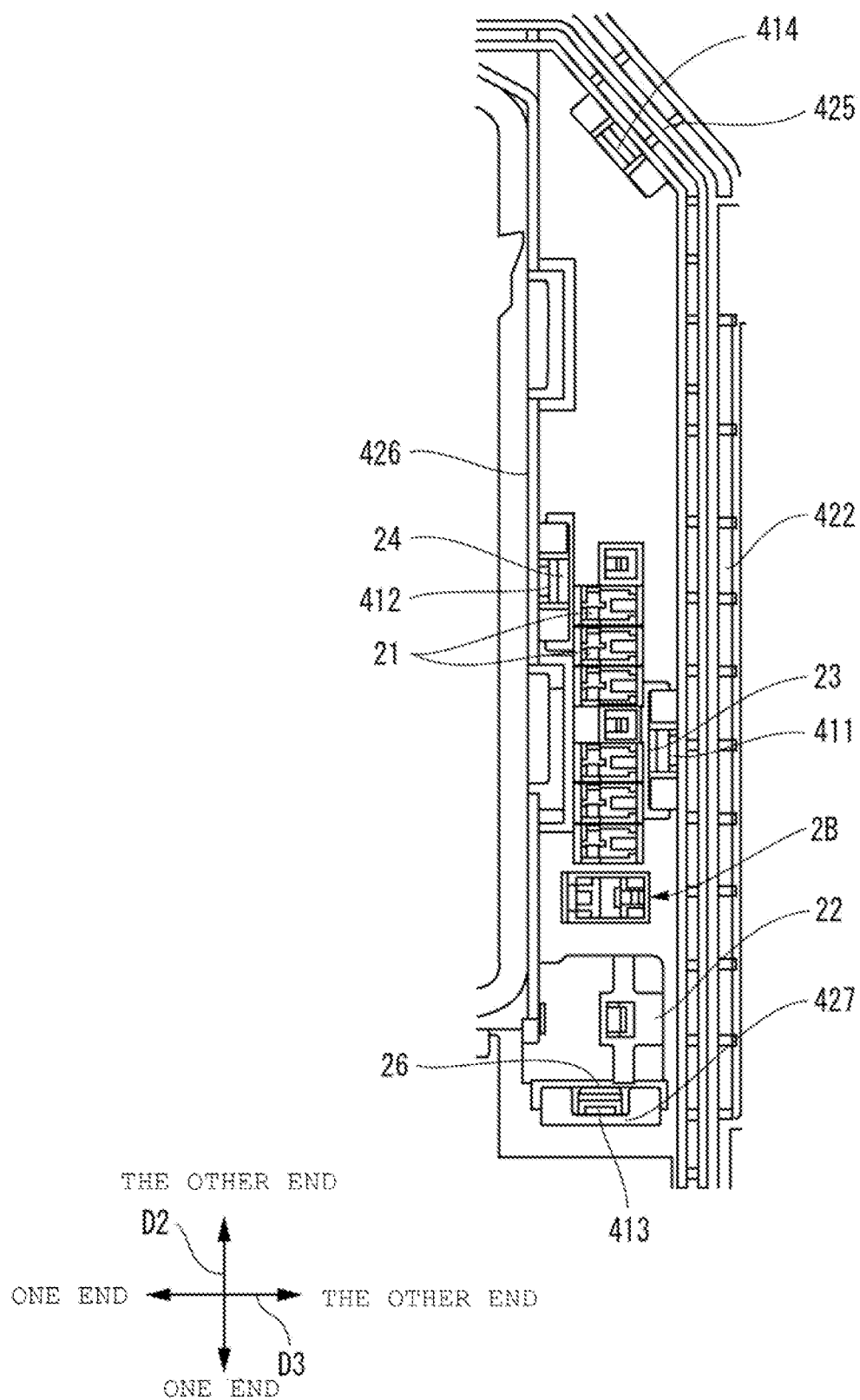
FIG. 7 is a partial top view explaining an accommodating method of a holding portion of the present invention.

Similar to the FL holder 2A, the FL holder 2B shown in FIG. 7 includes the mounting portions 21 and the input portion 22. The number of the mounting portions 21 in the FL holder 2B is smaller than the number of the mounting portions 21 in the FL holder 2A. Therefore, the FL holder 2B has a length smaller than that of the FL holder 2A in the longitudinal direction D2. In addition, a second locking portion 26 configured to be locked to the first locking portion 413 is provided at one end portion of the FL holder 2B in the longitudinal direction D2. Further, similar to the FL holder 2A, the second locking portions 23 and 24 are provided at both end portions of the FL holder 2B in the lateral direction D3.

Figure 8:
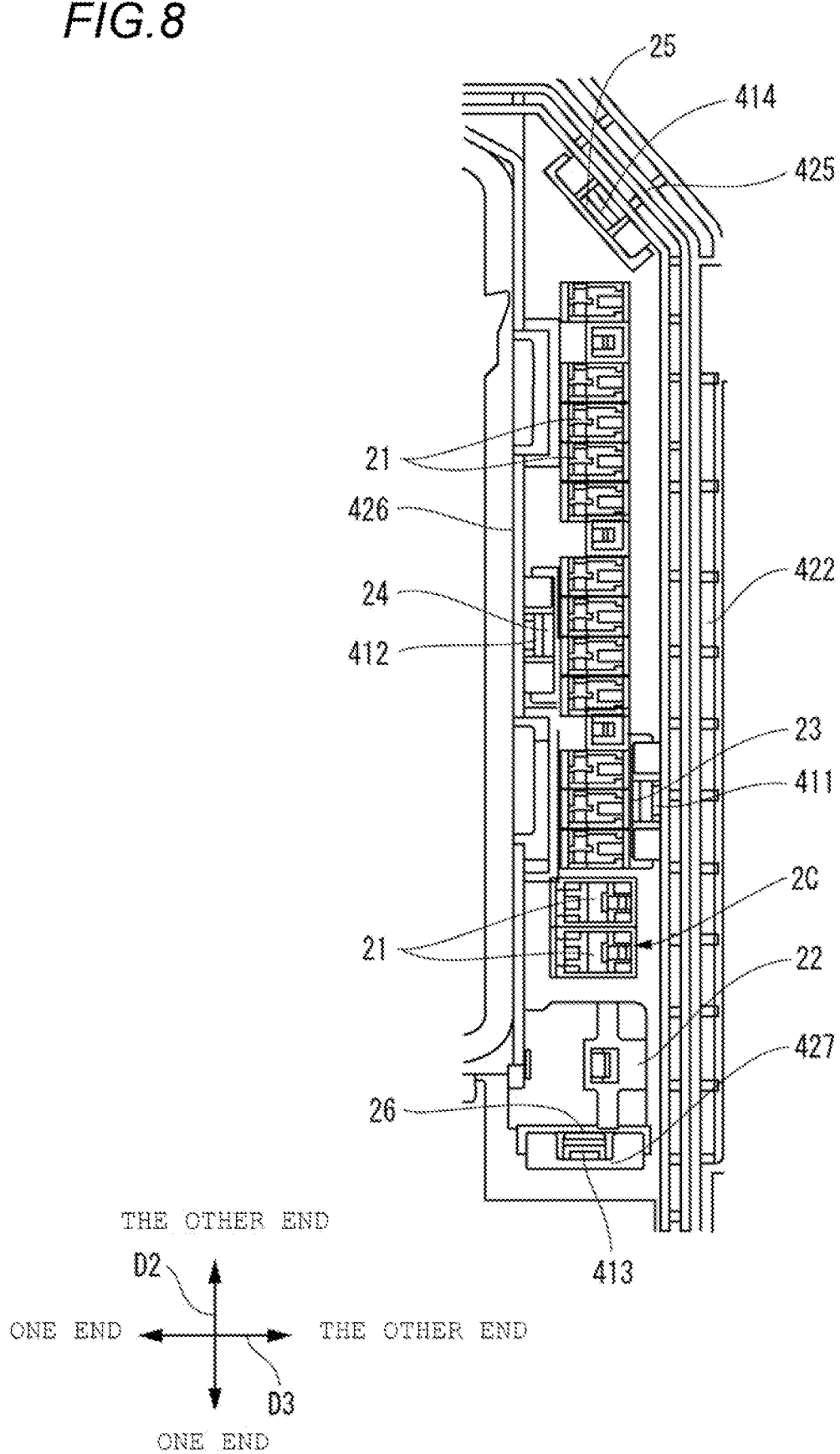
FIG. 8 is a partial top view explaining the accommodating method of a holding portion of the present invention.

Similar to the FL holder 2A, the FL holder 2C shown in FIG. 8 includes the mounting portions 21 and the input portion 22. The number of the mounting portions 21 in the FL holder 2C is larger than the number of the mounting portions 21 in the FL holder 2A. Therefore, the FL holder 2C has a length larger than that of the FL holder 2A in the longitudinal direction D2. In addition, the second locking portion 26 configured to be locked to the first locking portion 413 is provided at one end portion of the FL holder 2C in the longitudinal direction D2. Further, similar to the FL holder 2A, the second locking portions 23 and 24 are provided at both end portions of the FL holder 2C in the lateral direction D3. Further, similar to the FL holder 2A, the second locking portion 25 is provided at the other end portion of the FL holder 2C in the longitudinal direction D2.

In the case of specifications B and C in which the J/C adapter 3 is not selected, the FL holders 2B and 2C are accommodated in the accommodation portion 41 as shown in FIG. 7 and FIG. 8. Further, in the case of the specification A in which the J/C adapter 3 is selected, the FL holder 2A is locked to the accommodation portion 41 and the J/C adapter 3 is locked to the FL holder 2A as shown in FIG. 3.

According to the above embodiment, even when the accommodation portion 41 is not provided with the third locking portion 27 for locking the J/C adapter 3, the J/C adapter 3 can be locked to the FL holder 2 and accommodated in the accommodation portion 41. Accordingly, the FL holder 2 and the J/C adapter 3 can be accommodated in the common accommodation portion 41, and the space can be saved. Moreover, the J/C adapter 3 can be selectively mounted depending on the specifications.

According to the above embodiment, in the case of the specifications B and C in which the J/C adapter 3 is not selected, the FL holder 2B or 2C provided with the second locking portion 26 at one end portion in the longitudinal direction D2 is accommodated, and in the case of the specification A in which the J/C adapter 3 is selected, the FL holder 2A provided with the third locking portion 27 at one end portion in the longitudinal direction D2 is accommodated. Accordingly, in the case of the specifications B and C, one end portion of the FL holder 2B or 2C in the longitudinal direction D2 can be locked to the accommodation portion 41, and the locking between the FL holder 2B or 2C and the accommodation portion 41 can be strengthened.

The present invention is not limited to the above-described embodiments, and can be modified, improved, and the like as appropriate. In addition, the material, shape, dimension, number, arrangement position, or the like of each component in the above embodiment are optional and are not limited as long as the present invention can be achieved.

For example, the electronic component is not limited to the above fuse or branch circuit, but may be a relay or the like to be accommodated in the electric junction box 1.

In addition, the shapes of the first to fourth locking portions 411 to 414, 23 to 26, 27, and 31 are not limited to the above embodiment, and other well-known locking shapes may be used.

Further, the shape of the accommodation portion 41 is not limited to a long shape, and may be a square shape or an L shape.

Here, characteristics of the embodiment of the electric junction box and the accommodation method of a holding portion according to the present invention described above are summarized briefly in the following [1] to [5].

[1] An electric junction box (1) including:
a first holding portion (2A) and a second holding portion (3) that are configured to hold electronic components; and
a case (4) in which an accommodation portion (41) for accommodating the first holding portion (2A) and the second holding portion (3) is formed, wherein
the accommodation portion (41) is provided with first locking portions (411 to 414) configured to lock the first holding portion (2A), the first holding portion (2A) is provided with second locking portions (23 to 26) configured to be locked to the first locking portions (411 to 414) and a third locking portion (27) configured to be locked to the second holding portion (3), and the second holding portion (3) is provided with a fourth locking portion (31) configured to be locked to the third locking portion (27).

[2]

In the electric junction box (1) according to [1], the accommodation portion (41) is formed in a long shape, the third locking portion (27) is provided at one end portion of the first holding portion (2A) in a longitudinal direction (D2), and the first holding portion (2A) and the second holding portion (3) are arranged side by side in the accommodation portion (41) along the longitudinal direction (D2).

[3]

In the electric junction box (1) according to [1], the accommodation portion (41) is provided in a long shape, the second locking portions (23 to 26) are provided at both ends of the first holding portion (2A) in a lateral direction (D3), and the second locking portions (23 to 26) provided in the first holding portion (2A) in the lateral direction (D3) are provided at positions displaced in the longitudinal direction (D2).

[4]

An accommodating method of a holding portion for selectively accommodating, of first holding portions (2A to 2C) and a second holding portion (3) which are configured to hold electronic components, the second holding portion (3) into an accommodation portion (41) of an electric junction box (1), wherein when the second holding portion (3) is not selected, the first holding portion (2B, 2C) is locked to the accommodation portion (41), and when the second holding portion (3) is selected, the first holding portion (2A) is locked to the accommodation portion (41), and the second holding portion (3) is locked to the first holding portion (2A).

[5]

In the accommodating method of a holding portion according to [4], the accommodation portion (41) is formed in a long shape, two types of the first holding portion (2A) are prepared, one provided with a second locking portion (26) configured to be locked to the accommodation portion (41) at one end portion in a longitudinal direction (D2), and one provided with a third locking portion (27) configured to be locked to the second holding portion (3) at one end portion in the longitudinal direction (D2), when the second holding portion (3) is not selected, the first holding portion (2B, 2C) provided with the second locking portion (26) at one end portion in the longitudinal direction (D2) is accommodated, and when the second holding portion (3) is selected, the first holding portion (2A) provided with the third locking portion (27) at one end portion in the longitudinal direction (D2) is accommodated.

According to the electric junction box having the configuration of the [1] above, even when the accommodation portion is provided with only the first locking portion for locking the first holding portion, the second holding portion can be locked to the first holding portion and locked to the accommodation portion. Accordingly, the first holding portion and the second holding portion can be accommodated in the common accommodation portion, and the space can be saved.

According to the electric junction box having the configuration of the [2] above, the first holding portion and the second holding portion can be arranged side by side in the accommodation portion along the longitudinal direction.

According to the electric junction box having the configuration of the [3] above, the locking between the first holding portion and the accommodation portion can be strengthened by providing the second locking portions provided in the first holding portion in the lateral direction at different positions in the longitudinal direction.

According to the electric junction box having the configuration of the [4] above, even when the accommodation portion is provided with the third locking portion for locking the second holding portion, the second holding portion can be locked to the first holding portion and accommodated in the accommodation portion. Accordingly, the first holding portion and the second holding portion can be accommodated in the common accommodation portion, and the space can be saved. Moreover, the second holding portion can be selectively mounted depending on the specifications.

According to the electric junction box having the configuration of the [5] above, when the second holding portion is not selected, one end portion of the first holding portion in the longitudinal direction can be locked to the accommodation portion, and the locking between the first holding portion and the accommodation portion can be strengthened.

According to the present invention, it is possible to provide an electric junction box and an accommodating method of a holding portion, which achieve space-saving.

What is claimed is:

1. An electric junction box comprising:
a first holding portion that is configured to hold an electronic component;
a second holding portion that is configured to hold an electronic component; and
a case having a common accommodation portion for accommodating the first holding portion and the second holding portion,
wherein the common accommodation portion is provided with a first locking portion configured to lock the first holding portion,
the first holding portion is provided with a second locking portion configured to be locked to the first locking portion and a third locking portion configured to be locked to the second holding portion, and
the second holding portion is provided with a fourth locking portion configured to be locked to the third locking portion.

2. The electric junction box according to claim 1, wherein
the common accommodation portion is formed in a long shape,
the third locking portion is disposed at one end portion of the first holding portion in a longitudinal direction, and
the first holding portion and the second holding portion are arranged side by side in the common accommodation portion along the longitudinal direction.

3. The electric junction box according to claim 1, wherein
the common accommodation portion is formed in a long shape,
the second locking portion is disposed at each of both ends of the first holding portion in a lateral direction, and the second locking portions disposed at both ends of the first holding portion in the lateral direction are provided so as to be at positions displaced in the longitudinal direction.

4. An accommodating method of a holding portion for selectively accommodating, of a first holding portion and a second holding portion which are configured to hold electronic components, the second holding portion into a common accommodation portion of an electric junction box, the accommodating method comprising:

locking the first holding portion to the common accommodation portion when the second holding portion is not selected; and locking the first holding portion to the common accommodation portion and locking the second holding portion to the first holding portion when the second holding portion is selected.

5. The accommodating method of a holding portion according to claim 4, wherein the common accommodation portion is formed in a long shape, two types of the first holding portion are prepared, one provided with a second locking portion configured to be locked to the common accommodation portion at one end portion in a longitudinal direction, and the other provided with a third locking portion configured to be locked to the second holding portion at one end portion in the longitudinal direction, when the second holding portion is not selected, the first holding portion provided with the second locking portion at the one end portion in the longitudinal direction is accommodated in the common accommodation portion, and when the second holding portion is selected, the first holding portion provided with the third locking portion at the one end portion in the longitudinal direction is accommodated in the common accommodation portion.

* * * * *